United States Patent Office 3,088,876
Patented May 7, 1963

3,088,876
FILM FORMING LIPSTICK
William F. Buth, Port Jervis, N.Y., assignor to Kolmar Laboratories, Inc., Milwaukee, Wis., a corporation of Delaware
No Drawing. Filed Nov. 16, 1959, Ser. No. 853,004
5 Claims. (Cl. 167—85)

This invention relates to a lipstick composition and more particularly to a lipstick capable of forming a tough, homogeneous film on the lips.

In the past, a lipstick was originally made as a one-phase composition in which a wax or grease material was the base and a coloring material or dye was dispersed therein. This type of lipstick merely leaves a greasy deposit on the lip surface which is easily smeared.

More recently, two-phase lipsticks have been manufactured, which include a wax phase and hydrophilic dye solvent immiscible with the wax phase and containing a dye in solution. As the dye solvent is hydrophilic, it is attracted to and penetrates the skin, leaving a deep stain in the skin as opposed to the one-phase composition which does not stain.

A more recent development in the manufacture of lipstick is covered by Patent No. 2,873,229 which is directed to a three-phase lipstick. A three-phase lipstick includes the usual wax base, a hydrophilic dye solvent in which the dye is dissolved and a third oily phase which is a vehicle or carrier. The carrier is a thin liquid which is immiscible and non-compatible with the wax and dye solvent and provides the lipstick with sufficient fluidity so that the lipstick can be readily applied to the skin. After application to the skin, the carrier, which has no affinity for either the wax or dye solvent, bleeds out of the composition and the resulting lipstick remaining on the skin is a harder wax color deposit which will not smear.

In the two or three phase lipstick compositions, the usual dye is a fluorescein derivative, such as a bromo acid. The bromo acid has a tendency to irritate the skin and with some people, the irritation is so extreme that this type of lipstick cannot be used.

Attempts have been made in the past to incorporate an inert dye or color with a lipstick base which will harden to a tough film after application. However, these attempts have been unsuccessful, for no lipstick composition having sufficient fluidity for application and yet capable of hardening into a hard film, has been developed.

The present invention is directed to a novel concept of lipstick composition in which inert colors are dispersed in a solvent solution of a wax and resin. The resin, which is a rosin ester or a rosin derivative ester, is compatible with the wax and cooperates with the wax to provide a tough, homogeneous film on the lips which will not crack or flake after evaporation of the solvent. After application to the lips and on evaporation of the solvent, the resulting hard deposit has excellent adherence to the lips and yet provides a flexible coating which is tough enough to flex with the lip movement. As the colors employed are inert and are dispersed in the tough film, the problem of skin irritation is eliminated.

The lipstick of the invention has the following general composition:

| | Percent |
|---|---|
| Wax and fatty base | 20–50 |
| Resin | 5–20 |
| Inert color | 2–15 |
| Solvent for wax and resin | 10–50 |

When employed in stick form, the composition has the following range of proportion:

| | Percent |
|---|---|
| Wax | 25–40 |
| Resin | 10–20 |
| Inert color | 2–15 |
| Solvent for wax and resin | 25–50 |

A specific illustration of a lipstick composition falling within the above range is as follows:

| | Percent |
|---|---|
| Wax | 35 |
| Rosin ester | 15 |
| Inert color | 10 |
| Solvent for wax and rosin ester | 40 |

When the composition is to be used in paste form for a ballpoint applicator or brush, the overall compositional range is as follows:

| | Percent |
|---|---|
| Wax | 2–10 |
| Oil and fatty materials | 20–70 |
| Resin | 2–10 |
| Inert color | 2–15 |
| Solvent for wax and resin | 10–50 |

A specific illustration of a paste formulation falling within the scope of the invention is as follows:

| | Percent |
|---|---|
| Wax | 5 |
| Oil | 70 |
| Rosin ester | 5 |
| Inert color | 10 |
| Solvent | 10 |

The wax to be employed in the lipstick composition may be any of the conventional waxes used in lipsticks or cosmetic preparations and includes mineral, vegetable, hydrocarbon and synthetic waxes. Specific examples of waxes that can be used are carnauba, paraffin, ozokerite, montan, IG waxes derived from montanic acid, waxes derived from the Fischer-Tropsch synthesis, microcrystalline waxes, candelilla, polyethylene, polypropylene and the like.

When the composition is to be used in paste form, other fatty or oil materials commonly used in cosmetic preparations can be incorporated with the wax material. Specific examples of oils or fatty materials which can be used are castor oil, vegetable oil, oleyl alcohol, esters of fatty acids, such as butyl stearate, inverted esters, such as myristal lactate, mineral oil, and the like.

The term "wax phase" as used in the description is intended to cover pure wax constituents and mixtures thereof as well as wax constituents having minor amounts of oil or fatty materials incorporated therein.

The resin to be employed must be compatible with the wax, meaning that when the two materials are melted together or are dissolved in a mutual solvent and evaporated, they form a homogeneous phase without separation of the materials. Resins that can be employed are natural gums, such as shellac and gum dammar; rosin; rosin esters, such as ethylene glycol ester of rosin, glycerol ester of rosin, triethylene glycol ester of rosin and the like; and rosin derivative esters in which the rosin would be saponified, hydrogenated or polymerized rosin. In general, the esters of the rosin or rosin derivative are derived from polyols having up to 8 carbon atoms in the molecule or polyoxyalkylenes having up to 12 carbon atoms in the molecule.

The resin or tackifier provides flexibility and adhesion for the lipstick and enables the film, after evaporation of the solvent, to withstand stretching of the skin. The resins listed above provide adhesion of the lipstick film to the lips and particularly between the wet and dry line of the lips, but do not provide an excessively tacky surface so as to cause the lips to adhere together. The resin, in combination with the wax, provides the lipstick with toughness, adhesion and smoothness of application which is important to the finished product.

The colors to be employed are inert colors which are insoluble in water and also insoluble in the wax and solvent to be used. The color is uniformly dispersed within the lipstick mass and as it is an inert material, it will not penetrate the skin nor irritate the lips when the lipstick is applied.

Examples of colors which can be employed are D & C Red No. 1, D & C Red No. 2, D & C Red No. 3, D & C Red No. 7, D & C Red No. 9, D & C Red No. 11, D & C Red No. 31, D & C Yellow No. 1, D & C Yellow No. 5 and inorganic colors, such as iron oxide, carbon and the like.

The solvent to be employed is a material which will dissolve both the wax and the resin to be employed. Generally, the solvent is an aliphatic petroleum derivative having an initial boiling point in the range of 60° C. to 150° C. to thereby enable the solvent to completely evaporate within a period of 10 to 60 minutes after the lipstick is applied to the lips.

Specific solvents which may be employed are deodorized mineral spirits, deodorized Stoddards solvent and deodorized petroleum ether. The solvent will serve to dissolve both the wax and the resin and provide a lipstick which can be readily applied to the skin. After application, the solvent will evaporate in a period of 10 to 60 minutes to provide a hard, tough film of wax, resin and color on the lips. However, it has been found that the weight loss, due to evaporation of the lipstick itself before application to the lips, is insignificant, for in a 24 hour period the weight loss was only .33% due to evaporation of the solvent.

The lipstick of the invention is basically a film-forming type in which the solvent evaporates after application to the skin to leave a tough, resilient film on the lips. The solvent serves to soften the lipstick mass so that it can be readily applied to the skin as a normal lipstick. The resin, in combination with the wax provides a tough, flexible film which has excellent adherence to the lips and yet will flex with movement of the lips.

As inert colors are employed which are dispersed throughout the lipstick mass, the problem of skin irritation is eliminated, for the colors will not be attracted to the skin nor stain the lips.

As an additional feature, a mono alkyl ether of a polyoxyalkylene may be incorporated in the lipstick composition to speed up the initial setting of the lipstick until the solvent evaporates. The mono ethers are water soluble, non-volatile materials which are compatible with the wax in anhydrous form. On application of the lipstick to the lips, the mono ether on the surface of the lipstick film will be dissolved by the saliva or moisture present on the lips. The dissolving of the mono ether will provide a degree of set for the lipstick film which will make the film less fragile until the time when the solvent is completely evaporated.

The mono alkyl ethers of polyoxyalkylene contain from 1 to 2 carbon atoms in the alkyl group and from 2 to 12 carbon atoms in the alkylene group. The mono ethers are used in an amount of 5 to 10% by weight of the composition and an example of an overall lipstick composition, including the mono ether, is as follows:

|   | Percent |
|---|---|
| Wax and fatty base | 20–50 |
| Resin | 5–20 |
| Pigment | 2–15 |
| Solvent | 5–40 |
| Mono alkyl ether of a polyoxyalkylene | 5–10 |

Examples of mono ethers which can be employed are tripropylene glycol methyl ether, ethylene glycol methyl ether, diethylene glycol methyl ether, diethylene glycol mono ethyl ether, and the like.

To prepare the lipstick of the invention, the resin, such as the rosin ester, is initially dissolved in the solvent which is warmed to a temperature of about 70° C. After the resin has been dissolved, the melted waxes are added to the solvent and the pigment or color is then added to this mixture. The mixture is then milled and after milling, it is remelted and perfume and flavoring, if any, are added.

It is contemplated that small amounts of materials such as lanolin, perfume, flavoring and the like, may be added to the lipstick of the invention without departing from the concepts of the invention.

*Example No. 1*

15 grams of shellac were dissolved in 40 grams of deodorized mineral spirits at a temperature of about 70° C. 30 grams of paraffin wax at 5 grams of polyethylene, molecular weight approximately 5000, were melted and added to the warm solvent solution. 10 grams of D & C Red No. 11 were added to the solution and the solution was milled. After milling, the solution was remelted and perfume and flavoring were added. The resulting lipstick, when applied to the lips, provided a tough, homogeneous film which had excellent adherence to the lips after the mineral spirits evaporated in a period of about 30 minutes.

*Example No. 2*

15 grams of ethylene glycol ester of rosin was dissolved in 32 grams of Stoddard solvent at a temperature of about 65° C. 15 grams of carnauba wax and 18 grams of Duroxon R-21, a Fischer-Tropsch wax produced by Dura Commodities, were melted and the melted wax mixture was then added to the solvent solution and dissolved therein. 8 grams of D & C Red No. 31 and 2 grams of D & C Yellow No. 5 were added to the solution and the solution was then milled on a roller mill. After milling, the solution was remelted and a small amount of perfume was added and cast. The resulting lipstick was capable of being applied smoothly to the lips and provided a tough, homogeneous film after evaporation of the Stoddard solvent.

*Example No. 3*

A lipstick was prepared by dissolving 15 grams of triethylene glycol ester of polymerized rosin in 36 grams of mineral spirits. 35 grams of melted montan wax were then added to the solution and dissolved therein. After the wax was dissolved, 10 grams of D & C Red No. 11 and 4 grams of dipropylene glycol methyl ether were added to the solution and the solution was milled as in Example No. 2 to produce the cast lipstick.

*Example No. 4*

5 grams of candelilla wax and 70 grams of castor oil were melted together at a temperature of 70° C. 5 grams of Stabybelite Ester No. 5, which is a glycerol ester of hydrogenated rosin produced by the Hercules Powder Company of Wilmington, Delaware, and 10 grams of D & C Red No. 9 were then added to the melted oil and wax. The resulting mixture was then poured on a roller mill and ground to disperse the coloring materials within the mixture. 10 grams of deodorized mineral spirits were then added to the milled mixture at a temperature of 35° C. to dissolve the rosin ester, wax and oil. The resulting material was a lipstick paste to be used in an automatic dispensing lipstick brush. This lipstick, when applied to the lips, produced a hard, tough film after evaporation of the solvent in approximately 20 minutes.

*Example No. 5*

5 grams of montan wax and 50 grams of castor oil were melted at a temperature of 70° C. and 10 grams of D & C Red No. 7 and two grams of Stabybelite Ester No. 5 were added to the melted materials. The resulting mixture was poured on a roller mill and ground to uniformly disperse the coloring material within the composition.

33 grams of mineral spirits were then added to the mixture at a temperature of approximately 35° C. with agitation to dissolve the wax, oil and rosin derivative. The resulting lipstick was a paste which was to be used in a ballpoint applicator.

Various modes of carrying out the invention are contemplated as being within the scope of the following claims particularly pointing out and distinctly claiming the subject matter which is regarded as the invention.

I claim:

1. A lipstick composition consisting essentially by weight of 25% to 50% of a wax, 5% to 20% of a resin selected from the group consisting of rosin, shellac, gum dammar, polyol esters of rosin with the polyol radical having up to 8 carbon atoms, polyoxyalkylene esters of rosin with the polyoxyalkylene radical having up to 12 carbon atoms and mixtures thereof, 2% to 15% of a water insoluble pigment insoluble in said wax and said resin, and 10% to 50% of a solvent having an initial boiling point in the range of 60° C. to 150° C. and selected from the group consisting of mineral spirits, Stoddards solvent and petroleum ether, said solvent being miscible with said wax and said resin to provide a solid solution and being immiscible with the pigment, said pigment being dispersed as finely divided particles within the solid solution and said solvent evaporating after application of the lipstick to lips to provide a tough homogeneous film of said wax and resin with the pigment dispersed within the film.

2. The composition of claim 1 in which the wax is montan and the resin is the glycerol ester of hydrogenated rosin.

3. A lipstick composition, consisting essentially by weight of 2% to 10% wax, 20% to 70% cosmetic oil and fatty materials, 2% to 10% of a resin selected from the group consisting or rosin, shellac, gum dammar, polyol esters of rosin with polyol radical having up to 8 carbon atoms, polyoxyalkylene esters of rosin with the polyoxyalkylene radical having up to 12 carbon atoms and mixtures thereof, 2% to 15% of a water insoluble pigment insoluble in said wax and said resin, and 10% to 50% of a solvent having an initial boiling point in the range of 60° C. to 150° C. and selected from the group consisting of mineral spirits, Stoddards solvent and petroleum ether, said solvent being miscible with said wax and said resin to provide a solid solution and being immiscible with the pigment, said pigment being dispersed as finely divided particles within the solid solution and said solvent evaporating after application of the lipstick to lips to provide a tough homogeneous film of said wax and resin with the pigment dispersed within the film.

4. A lipstick composition, consisting essentially by weight of 25% to 50% of a wax, 5% to 20% of a resin selected from the group consisting of rosin, shellac, gum dammar, polyol esters of rosin with the polyol radical having up to 8 carbon atoms, polyoxyalkylene esters of rosin with the polyoxyalkylene radical having up to 12 carbon atoms and mixtures thereof, 2% to 15% of a water insoluble pigment insoluble in said wax and said resin, 10% to 50% of a solvent having an initial boiling point in the range of 60° C. to 150° C. and selected from the group consisting of mineral spirits, Stoddards solvent and petroleum ether, said solvent being miscible with said wax and said resin to provide a solid solution and being immiscible with the pigment, said pigment being dispersed within the solid solution, and 5% to 10% of a mono alkyl ether of a polyoxyalkylene with said alkyl group having from 1 to 2 carbon atoms and said polyoxyalkylene group having from 2 to 12 carbon atoms, said mono alkyl ether being water soluble and being dissolved from the lipstick by moisture on the lips to provide an initial degree of surface hardness for the lipstick before complete evaporation of the solvent.

5. The composition of claim 4 in which the mono alkyl ether is dipropylene glycol methyl ether.

References Cited in the file of this patent

UNITED STATES PATENTS

| | | |
|---|---|---|
| 1,282,706 | Nelson | Oct. 22, 1918 |
| 1,289,103 | Briggs | Dec. 31, 1918 |
| 2,230,063 | Klimist | Jan. 28, 1941 |
| 2,371,473 | Sanford | Mar. 13, 1945 |

OTHER REFERENCES

Merck Index, Merck & Co., Rahway, New Jersey, 6th Ed., 1952, pp. 573, 733.